(12) United States Patent
Setayesh et al.

(10) Patent No.: US 11,270,320 B2
(45) Date of Patent: *Mar. 8, 2022

(54) METHOD AND SYSTEM FOR IMPLEMENTING AUTHOR PROFILING

(71) Applicant: ORACLE INTERNATIONAL CORPORATION, Redwood Shores, CA (US)

(72) Inventors: Mehrshad Setayesh, Lafayette, CO (US); Timothy P. Mccandless, Boulder, CO (US)

(73) Assignee: Oracle International Corporation, Redwood Shores, CA (US)

(*) Notice: Subject to any disclaimer, the term of this patent is extended or adjusted under 35 U.S.C. 154(b) by 872 days.

This patent is subject to a terminal disclaimer.

(21) Appl. No.: 15/470,368

(22) Filed: Mar. 27, 2017

(65) Prior Publication Data

US 2017/0200175 A1    Jul. 13, 2017

Related U.S. Application Data

(63) Continuation of application No. 13/795,699, filed on Mar. 12, 2013, now Pat. No. 9,607,340.

(51) Int. Cl.
| | |
|---|---|
| *G06Q 30/02* | (2012.01) |
| *G06F 16/35* | (2019.01) |
| *G06F 16/335* | (2019.01) |
| *G06F 16/33* | (2019.01) |
| *G06Q 10/10* | (2012.01) |

(Continued)

(52) U.S. Cl.
CPC ....... *G06Q 30/0201* (2013.01); *G06F 16/335* (2019.01); *G06F 16/3344* (2019.01); *G06F 16/35* (2019.01); *G06Q 10/10* (2013.01); *G06Q 30/0276* (2013.01); *G06Q 50/01* (2013.01); *G06F 16/285* (2019.01)

(58) Field of Classification Search
None
See application file for complete search history.

(56) References Cited

U.S. PATENT DOCUMENTS

| | | |
|---|---|---|
| 7,289,949 B2 | 10/2007 | Warner et al. |
| 8,769,576 B2 | 7/2014 | Burkit et al. |
| 8,775,429 B2 | 7/2014 | Choudary et al. |

(Continued)

OTHER PUBLICATIONS

Final Office Action dated Dec. 29, 2017 for related U.S. Appl. No. 13/795,802.

(Continued)

*Primary Examiner* — Amresh Singh
(74) *Attorney, Agent, or Firm* — Vista IP Law Group, LLP

(57) ABSTRACT

Disclosed is an improved method, system, and computer program product for implementing an author profiling tool for receiving data created by a plurality of authors, profiling the plurality of authors by performing semantic analysis upon the data, generating a plurality of author profiles for identifying topics of interest to the author based upon results from the semantic analysis and correlating topics of interest by analyzing the plurality of author profiles to identify common topics between the plurality of authors. These author profiles can be used to identify and correlate topical interests by consumers. An enterprise or business can more effectively market to the consumers based upon this knowledge of the consumers' interests.

20 Claims, 5 Drawing Sheets

(51) Int. Cl.
*G06Q 50/00* (2012.01)
*G06F 16/28* (2019.01)

(56) References Cited

U.S. PATENT DOCUMENTS

| | | | |
|---|---|---|---|
| 8,930,384 B2 | 1/2015 | Sommer | |
| 2003/0135499 A1 | 1/2003 | Schirmer | |
| 2008/0256093 A1 | 10/2008 | Amitay | |
| 2010/0211868 A1 | 8/2010 | Karmarkar et al. | |
| 2011/0066613 A1 | 3/2011 | Berkman et al. | |
| 2011/0072052 A1* | 3/2011 | Skarin | G06F 16/22 707/794 |
| 2011/0213785 A1 | 9/2011 | Kristiansson et al. | |
| 2011/0246378 A1 | 10/2011 | Prussack et al. | |
| 2012/0030210 A1 | 2/2012 | Sankhla et al. | |
| 2012/0047219 A1 | 2/2012 | Feng et al. | |
| 2012/0191644 A1 | 7/2012 | Carter et al. | |
| 2012/0215844 A1* | 8/2012 | Ferlez | G06Q 10/10 709/204 |
| 2012/0278387 A1 | 11/2012 | Garcia | |
| 2012/0290399 A1 | 11/2012 | England et al. | |
| 2012/0324004 A1 | 12/2012 | Le et al. | |
| 2013/0018896 A1* | 1/2013 | Fleischman | G06Q 50/01 707/748 |
| 2013/0046579 A1* | 2/2013 | Feiks | G06Q 10/08355 705/7.31 |
| 2013/0054667 A1 | 2/2013 | Mahajan | |
| 2013/0097176 A1 | 4/2013 | Khader et al. | |
| 2013/0179440 A1 | 7/2013 | Gordon | |
| 2013/0246430 A1 | 9/2013 | Szucs et al. | |
| 2013/0275429 A1 | 10/2013 | York et al. | |
| 2014/0052718 A1 | 2/2014 | Waupotitsch et al. | |
| 2014/0136323 A1 | 5/2014 | Zhang et al. | |
| 2014/0278769 A1 | 9/2014 | Mcandless et al. | |
| 2014/0280168 A1 | 9/2014 | Setayesh et al. | |
| 2014/0280525 A1 | 9/2014 | Mccandless et al. | |

OTHER PUBLICATIONS

Non-final Office Action dated Jun. 15, 2017 for related U.S. Appl. No. 13/795,802.
Non-final Office Action dated Jan. 6, 2015 for related U.S. Appl. No. 13/795,699.
Final Office Action dated Aug. 14, 2015 for related U.S. Appl. No. 13/795,699.
Non-final Office Action dated Apr. 8, 2015 for related U.S. Appl. No. 13/795,802.
Third Party Submission pursuant to 35 USC 122(e) and 37 CFR 1.290 filed on Sep. 23, 2014, in related U.S. Appl. No. 13/795,895.
Non-final Office Action dated Mar. 25, 2015 for related U.S. Appl. No. 13/795,895.
Final Office Action dated Oct. 8, 2015 for related U.S. Appl. No. 13/795,895.
Final Office Action dated Oct. 22, 2015 for related U.S. Appl. No. 13/795,802.
Non-final Office Action dated Dec. 21, 2015 for related U.S. Appl. No. 13/795,699.
Notice of Allowance and Fee(s) dated Apr. 25, 2016 for related U.S. Appl. No. 13/795,895.
Non-Final Office Action dated Jul. 1, 2016 for related U.S. Appl. No. 13/795,802.
Final Office Office Action dated Aug. 4, 2016 for related U.S. Appl. No. 13/795,699.
Advisory Action dated Oct. 19, 2016 for related U.S. Appl. No. 13/795,699.
Notice of Allowance and Fee(s) dated Nov. 14, 2016 for related U.S. Appl. No. 13/795,699.
Final Office Action dated Jan. 4, 2017 for related U.S. Appl. No. 13/795,802.
Notice of Allowance dated Sep. 21, 2020 for related U.S. Appl. No. 13/795,802.
David Alfred Ostrowski et al, "Semantic Social Network Analysis for Trend Identification", 2012 IEEE Sixth International Conference on Semantic Computing, pp. 178-185 (Sep. 2012).
Sungjoon Lee et al, "A Semantic Network and Categorical Content Analysis of Internet and Online Media Research", The Open Communication Journal 3(1), 15-28 (Dec. 2009).
Peter A. Gloor et al, "Web Science 2.0: Identifying Trends through Semantic Social Network Analysis", 2009 International Conference on Computational Science and Engineering, pp. 215-222 (Aug. 2009).

* cited by examiner

METHOD AND SYSTEM FOR IMPLEMENTING AUTHOR PROFILING

CROSS REFERENCE TO RELATED U.S. PATENT APPLICATION

This present application is a continuation of U.S. patent Ser. No. 13/795,699 filed on Mar. 12, 2013, issued on Mar. 28, 2017 as U.S. Pat. No. 9,607,340 and entitled "METHOD AND SYSTEM FOR IMPLEMENTING AUTHOR PROFILING", which is hereby incorporated by reference in its entirety.

BACKGROUND

If businesses are able to obtain an accurate assessment about the interests held by consumers, then the businesses can act upon that knowledge to more effectively market products and services to those consumers. For example, accurate information about topics and subjects of interest to consumers can be to create sales leads or more targeted advertising to the consumers.

One possible way to obtain this information is to ask consumers to fill out surveys and to then use the survey responses to target the consumers having interests in particular products and services.

However, there are numerous known problems with this approach. First, many surveys tend to have low response rates. In addition, consumers may not necessarily respond honestly or comprehensively to the survey questions, causing concerns about the accuracy of the survey results. Also, surveys are often targeted at certain demographic groups of consumers, which may erroneously pre-filter other consumers that should be included within the target audience for the business.

Therefore, there is a need for an improved approach to perform analysis of possible consumers for businesses and enterprises.

SUMMARY

Embodiments of the present invention provide an improved system, method, and computer program product for analyzing interests of consumers. Semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

Other additional objects, features, and advantages of the invention are described in the detailed description, figures, and claims.

DETAILED DESCRIPTION

Given the widespread availability and usage of the internet by consumers, many businesses have become interested in being able to effectively monitor the content and commentary provided by such consumers. Interactive websites such as social networks and blogs provide a wealth of useful information that can be advantageously used by a business. Therefore, it would be very useful to provide an effective mechanism to allow businesses and enterprise business applications to interact with and take action upon data that originate from online sources of social data and commentary.

The present disclosure is directed to an approach for allowing a business entity to access and integrate with social media data. The invention is capable of accessing data across multiple types of internet-based sources of social data and commentary and to perform semantic analysis upon that data. Semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

Figure 1:
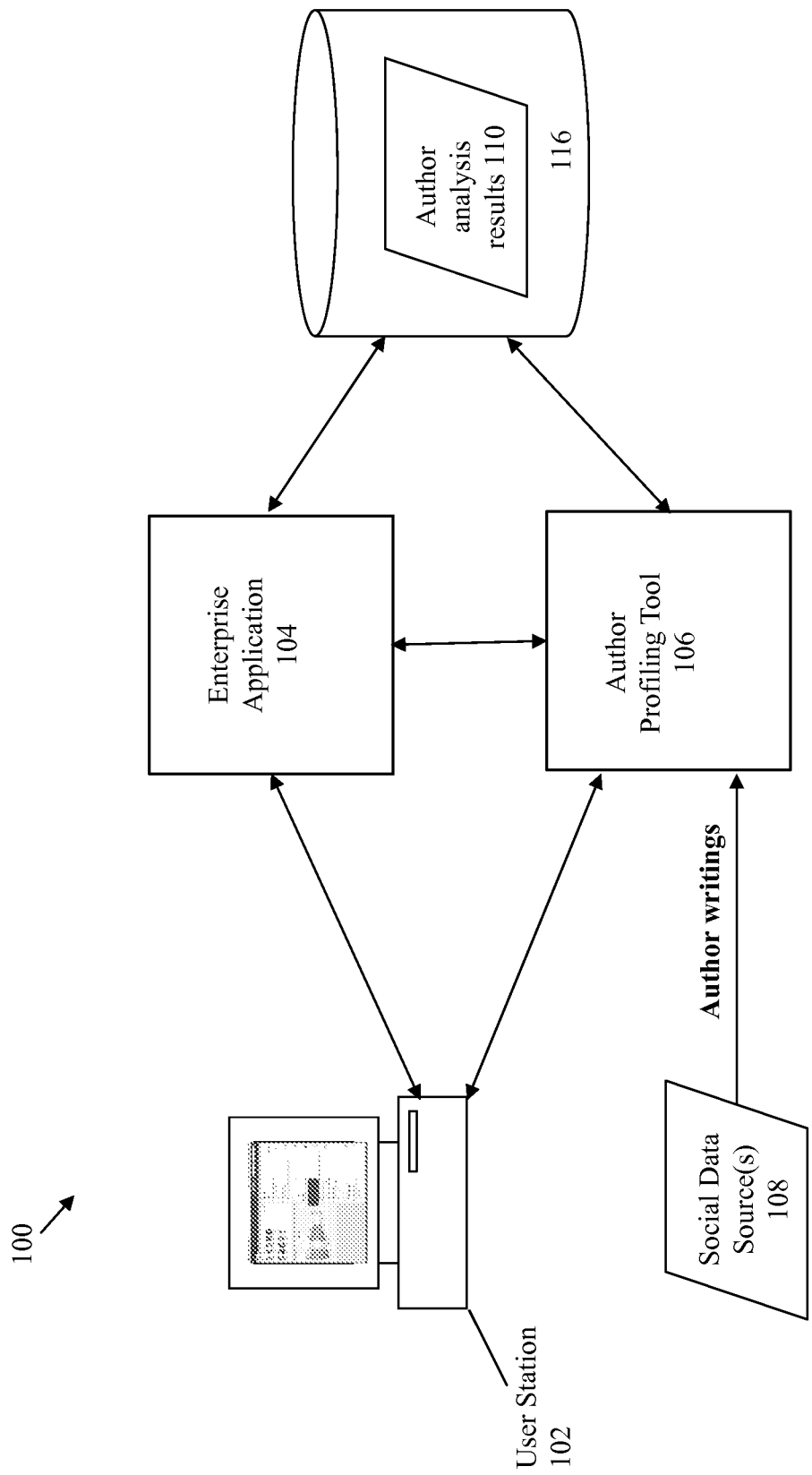
FIG. 1 illustrates a system to implement author profiling according to embodiments of the invention.

FIG. 1 illustrates an example system 100 which may be employed in some embodiments of the invention to implement author profiling. The system includes one or more users at one or more user stations 102 that operate the author profiling tool. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system, such as a mouse or keyboard to manipulate a pointing object in a graphical user interface to generate user inputs to an enterprise application 104 and/or author profiling tool 106.

The author profiling tool 106 provides a framework for analyzing writings generated by authors on social media sites. The author profiling tool 106 receives data from one or more online social data sources. Such social data sources include, for example, websites such as a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Semantic analysis, classification, and filtering are performed upon the author writings. Essentially, the writings of the authors are reviewed to identify the topics and subjects of the author's works. This type of analysis can then be performed for multiple authors, where authors having similar analysis vectors are grouped together. Actionable data can then be identified based upon the analysis results.

According to some embodiments, integration is provided between the author profiling tool 106 and an enterprise application 104. The enterprise application 104 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, California.

For the purposes of explanation, one or more embodiments are illustratively described with reference to CRM applications. It is noted, however, that the invention may be applied to other types of enterprise applications as well, and is not to be limited to CRM applications unless explicitly claimed as such.

The analysis results 110 are stored into a database in a computer readable storage device 116. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

Figure 2:
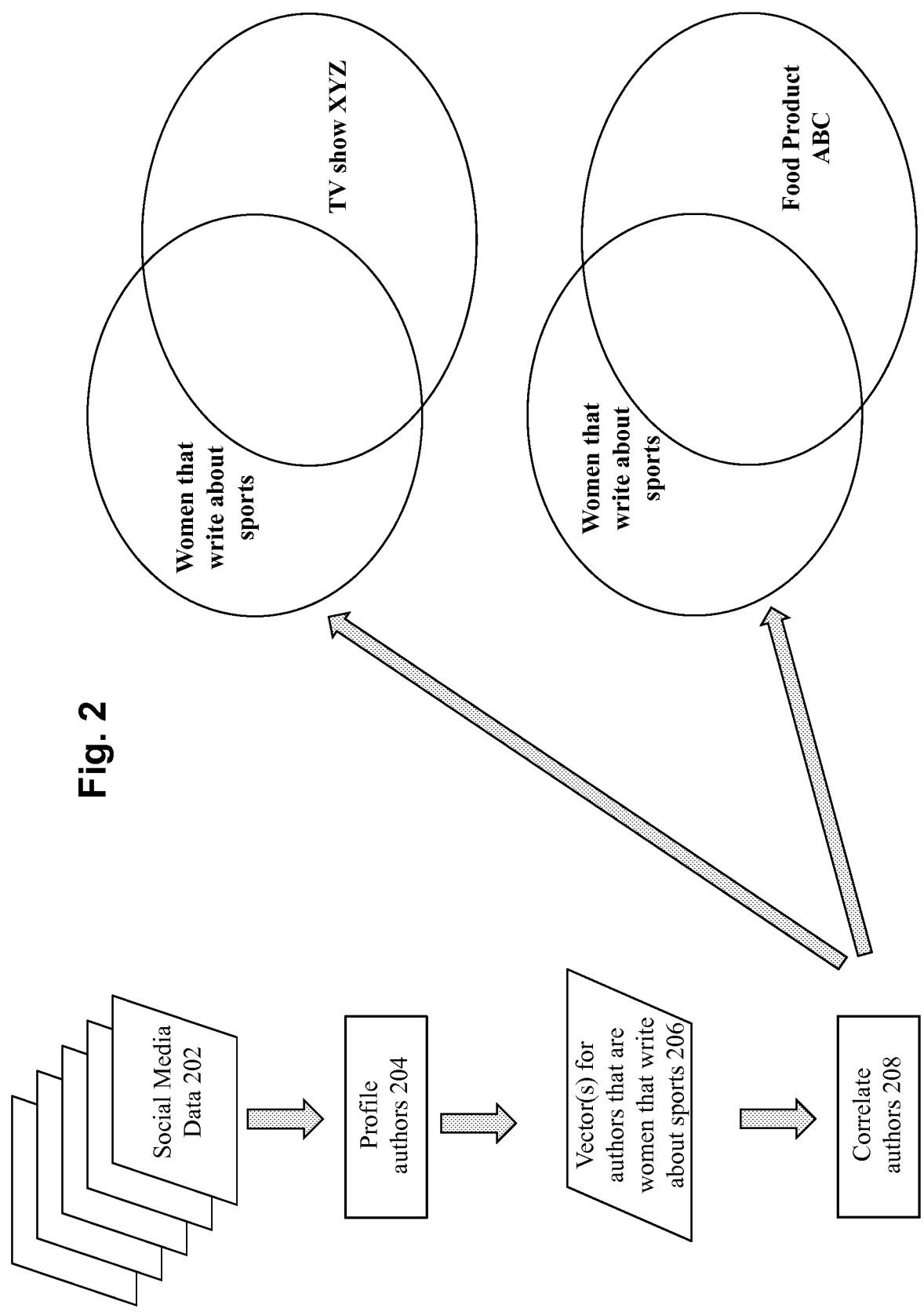
FIG. 2 illustrates a process for analyzing author writings according to embodiments of the invention.

FIG. 2 shows an illustrative example of how author profiling can be used to generate analysis results. The process begins by acquiring author writings 202 from one or more social network systems, e.g., from public blog sites, twitter messages, RSS data, and social media sites such as Facebook. In some embodiments, the data that is received for processing may include non-social data. Such data includes, for example, non-social data (e.g., email, chats, transcribed phone conversations, transcribed videos).

Author profiling is performed upon the received data at 204. Semantic analysis is performed upon the received data to implement author profiling. For example, latent semantic analysis (LSA), an advanced form of statistical language modeling, can be used to perform semantic analysis upon the author writings. This permits the system to understand the contextual and semantic significance of terms that appear within the social data. For example semantic analysis can be used to understand the difference between the term "Galaxy" used in the author writing for astronomy content, and "Galaxy" in the author writing to refer to the name of a professional soccer team.

The system performs semantic analysis and classification to the social media data to create and identify themes, and to cluster together like-minded messages, topics, conversations, and content from the authors. This action is performed by categorizing the subjects of the author writings.

Strength numbers may be formed and associated with the different categories. The strength numbers indicate the extent or degree of affinity and/or interest by the author for any particular subject relative to other subjects. Using these strength numbers, a vector can therefore be defined for each author that establishes a profile of the interest for that author.

In some embodiments, the social data content is subject to semantic filtering to reduce the excess "noise" of irrelevant data. Semantic filtering is a mechanism that is provided to minimize miss-categorizations of the social data. Much of the social data is likely to contain content which is of very little interest. Semantic filtering is used to remove the irrelevant material from the social data to reduce the occurrence of false positives, false negatives, and inappropriate responses/rejections within the actionable data. This permits the resulting data to be more relevant and accurate.

The profiling process is repeated for numerous authors identified from the social media sources. At the end of this process, the analysis results will include vector data for numerous authors, where the vectors indicate the affinities between the authors pertaining to common topics or subjects.

For example, it may be of interest for businesses to know about the demographic class of consumers that are female authors who write messages on social media about sports. In this case, the author vectors 206 can be used to identify the authors having an affinity for this subject. Thus, in one embodiment of the invention, a business may pre-configure these types of topics, and the author profiles are used to search for authors that correspond to the pre-configured topic categories. In an alternate embodiment, these subject areas are not pre-defined. Instead, the analysis results are reviewed to discover commonality of subject areas based upon the authors' written works.

To illustrate, as shown in FIG. 2, the author profiles may be used to identify a grouping of authors that all correspond to women that tend to write social media messages/postings about sports.

The clustered set of data for these authors can then be analyzed to identify other common areas of interest that may be revealed by the author profiles. By performing correlation analysis 208, it is possible to discover other areas of commonality between these authors. For example, review of the author profiles may reveal that a substantial percentage of these authors also watch the "XYZ" TV show and have shown an interest in the "ABC" food product.

This type of correlation data is quite useful to a business organization. For example, businesses that market the "ABC" food product, or its competition, can use this information to specifically target this demographic group for its marketing campaigns. In addition, since the business knows this demographic group tends to watch the "XYZ" TV show, an effective advertisement campaign may be implemented by purchasing commercial advertisement time for this TV show or by providing advertisements on the website and/or Facebook for the show.

For many reasons, this approach provide much better analysis results when compared against the prior art approach of using surveys. Since the analysis is based upon the authors' own writings, the analysis results will produce much more accurate results when compared to the typical voluntary survey responses. Moreover, the present approach allows analysis to be performed over a very broad proportion of the general public, especially as compared to surveys that tend to have very limited response rates.

In addition, prior art surveys are often targeted at specific demographic groups of consumers, which may erroneously filter out other consumers that should be included within the target audience for a business. The present invention can be directed at the general public, ensuring that the broadest possible group of consumers is included in the analysis results.

The present approach is particularly useful at discovering correlations between consumers, even where those correlations are not known or expected upfront. This is because the semantic analysis and correlation process will cluster like-authors together using the contents of the author's own writings, without pre-conceptions about the subjects of those writings. As such, serendipitous discoveries are likely to occur from the disclosed author analysis.

Figure 3:
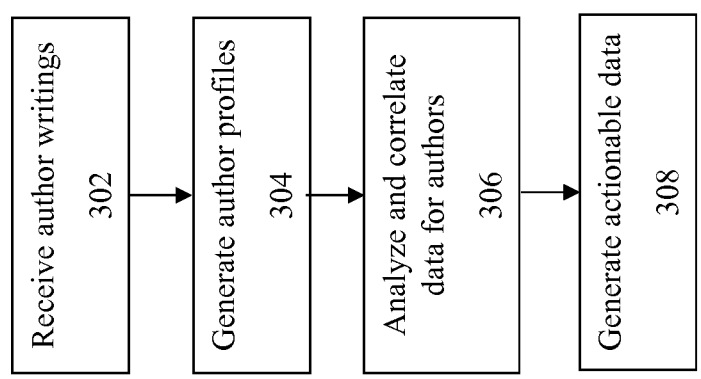
FIG. 3 illustrates a flowchart of an approach to perform author profiling according to embodiments of the invention.

FIG. 3 shows a flowchart of an approach to implement some embodiments of the invention. At 302, the author writings are received for analysis. As noted above, the author writings may be received from any suitable source of the data, including both social media data sources as well non-social sources.

At 304, themes analysis is performed for the writings by the authors. Based upon the semantic analysis and classification, themes are identified within the authors' works. These themes can be used to establish profiles for the authors.

At 306, the author profiles are analyzed to identify correlations between the different authors. For example, authors that have written about similar topics may be reviewed to identify other areas of commonality between those authors.

At 308, actionable data is generated for those authors. The actionable data correspond to areas of analytical importance with respect to the specific organizations that will be consuming the results of the system. For example, a business may seek to use the system to analyze author writings to (1) identify sales leads and (2) identify customer relations issues and dissatisfied customers. If these are the business' goals, then at least some of the analysis results will, in some embodiments, correspond to identification of the content that pertain to these categories, e.g., the information can be used to direct sales leads to the appropriate sales department.

The actionable data can be processed using any suitable processing mechanism. In one embodiment, automated processing is performed using a rules and workflow engine. In this approach, a set of rules is provided in a rulebase, where the rules identify how the actionable data should be handled and directed within the organization. The system then dispatches and/or creates the appropriate messages to be sent to destinations within the enterprise. For example, opportunity messages can be sent to a CRM system, where a record is automatically created and/or process in the system for the sales lead. Product data and comments can be provided to ecommerce products and groups. The present invention can therefore be used to provide a framework for integrating a corporate infrastructure to analysis results from the author profiling tool.

Figure 4:
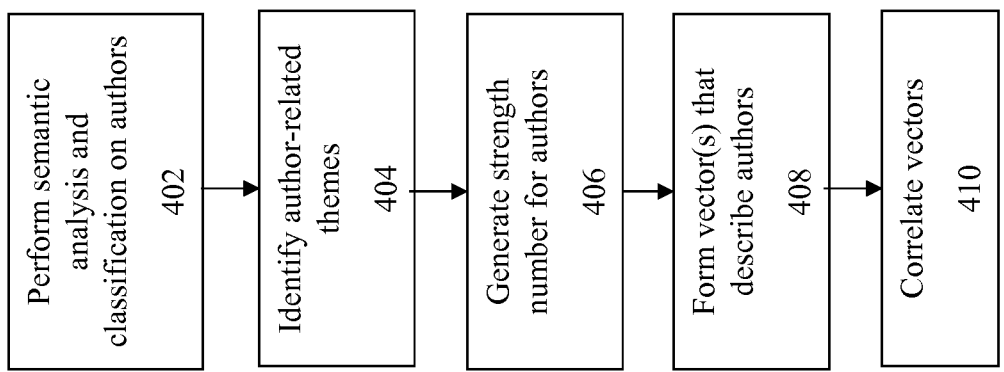
FIG. 4 illustrates a flowchart of an approach to analyze author writings according to embodiments of the invention.

FIG. 4 shows a flowchart of an approach to generate the author profile. At 402, semantic analysis, classification, and filtering are performed upon the author writings. This permits the system to understand the contextual and semantic significance of terms that appear within the social data. Filtering may be applied to remove irrelevant data from the analysis.

At 404, specific themes are identified within the author writings. The themes are identified based upon the topics and subjects revealed from the semantic analysis and classification process. Therefore, categorization is performed upon the subjects of the author writings. At 406, strength numbers are associated with the different categories that correspond to the authors. These strength numbers indicate the relative affinity of each author to a particular topic, subject, or theme.

At 408, a vector can then be defined for each author using the strength numbers for the different categories. The vector establishes a profile of the interests for that author, and can be used to describe and analyze that author with respect to the author's interests.

The author profiles may be used to identify a large grouping of authors that correspond to similar areas of interests. Therefore, at 410, the vectors can be correlated to perform commonality analysis among the authors. As noted above, the results from performing this type of correlation can be very useful to a business organization, e.g., for marketing or customer service purposes.

Therefore, what has been described is an improved system, method, and computer program product for analyzing interests of consumers, where semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

System Architecture Overview

Figure 5:
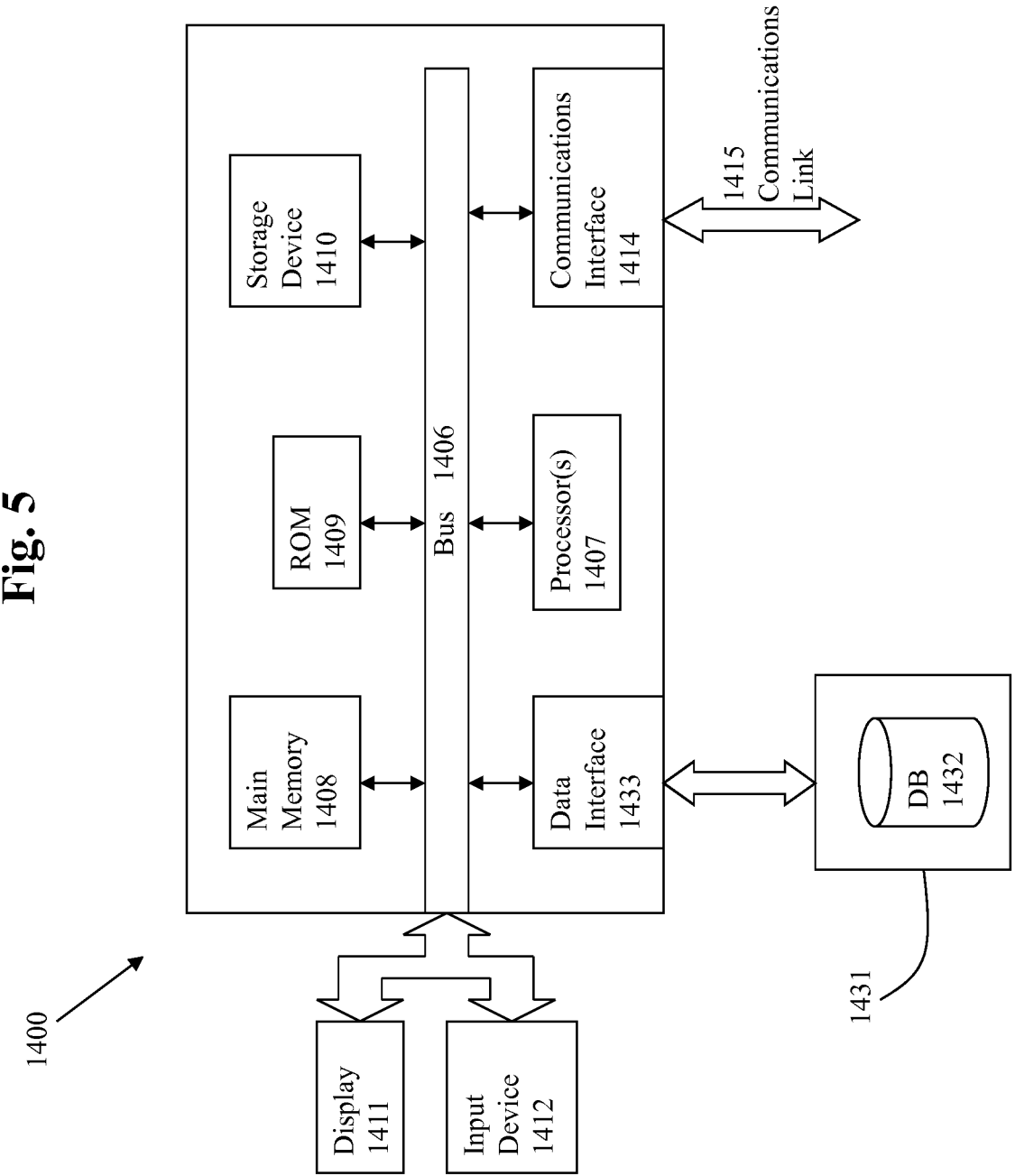
FIG. 5 depicts a computerized system on which an embodiment of the invention can be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. Computer system 1400 may communicate through a data interface 1433 to a database 1432 on an external storage device 1431.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing data comprising:
   receiving, at an author profiling tool, data created by a group of authors;
   performing a multi-stage profiling for the group of authors for determining a targeted presentation to at least some of the group of authors, the multi-stage profiling comprising:
      from within the group of authors, performing a first stage profiling to determine a first subgroup from the group of authors at least by:
         determining a first topic of interest from the data created by the group of authors at least by:
            performing a themes analysis upon the data created by the group of authors to create multiple themes and respective strengths for the multiple themes; and
            determining the first topic based at least in part upon the multiple themes and the respective strengths from the themes; and
         determining the first subgroup having first multiple authors from the group of authors based at least in part upon respective affinities of the first multiple authors for the first topic of interest;
      from within the first subgroup, performing a second stage profiling to determining a second subgroup from the first subgroup at least by:
         determining a second topic of interest at least by performing a correlation analysis on the data created by the first multiple authors in the first subgroup based at least in part upon the multiple themes; and
         determining the second subgroup having second multiple authors from within the first subgroup based at least in part upon respective degrees of interest of the second multiple authors for the second topic of interest, wherein the second topic of interest is common to the second multiple authors in the second subgroup, and the second topic is different from the first topic; and
   presenting, to the first subgroup having the first multiple authors, the targeted presentation pertaining to the second topic of interest that is common to the second subgroup.

2. The method of claim 1, further comprising generating actionable data using at least some of a plurality of author profiles, wherein the first topic of interest is determined without targeting specific groups of authors and without referencing information about the first topic of interest, wherein generating the plurality of author profiles further comprises:
   identifying a theme within the data that is created by the group of authors; and
   generating a respective strength number corresponding to an extent or degree of interest by the author for the first topic of interest, wherein
      the data is received at the author profiling tool and is not targeting specific demographic groups,
      the first topic of interest is determined from the data without targeting the specific demographic groups, and
      the first topic of interest is determined with the themes analysis without preconceived notions about the data in the themes analysis.

3. The method of claim 1, further comprising:
   correlating the first subgroup with the second subgroup in response to an identification of the second topic of interest, wherein the data is not targeting specific demographic groups of authors;
   classifying the data created by the group of authors into a plurality of classes based in part or in whole upon topics of interest determined by the themes analysis, classifying the data including:
      creating a set of themes from results of the themes analysis;
      determining multiple subjects of multiple topics of interest based in part or in whole upon the set of themes;
      determining similarity among the multiple subjects of the multiple topics of interest at least by analyzing the plurality of author profiles;
      clustering the multiple topics of interest into the plurality of classes based in part or in whole upon the similarity among the multiple subjects;
   determining the respective strengths for the group of authors, a respective strength for an author of the group of authors indicating relative affinity of the author to a category in the data relative to one or more remaining categories in the data;
   associating the respective strengths that respectively correspond to the group of authors with a plurality of categories; and
   creating a first vector for each author of the first subgroup of authors, wherein vectors for the group of authors respectively indicate the respective affinities among the first multiple authors to one or more common topics of interests or one or more subjects.

4. The method of claim 3, further comprising:
   modifying the plurality of classes determined from classifying the data created by the group of authors at least by reducing a false positive, a false negative, and inappropriate content with a filtering process;
   identifying actionable data based in part or in whole upon a result of the filtering process, wherein the data created by the group of authors includes contents transcribed from non-social data;
   determining, at a rule and workflow module stored at least partially in memory, a plurality of computing systems to receive the actionable data based in part or in whole upon a set of rules that identifies how the actionable data is to be processed and directed;
   preconfiguring a plurality of types of topics of interest;
   determining a first set of authors that corresponds to one or more first types of topics of interest of the plurality of types of topics of interest at least by analyzing the plurality of author profiles to identify a first set of author profiles respectively corresponding to the first set of authors;
   determining second commonality within one or more second types of topics of interest of the plurality of types of topics of interest without pre-defining the one or more second types of topics of interest;

identifying first commonality among the data in response to the one or more second types of topics of interest based in part or in whole upon results of the themes analysis;

identifying a group of authors that corresponds to a first affinity for a first subject;

determining a second affinity and a third affinity shared by at least a threshold percentage of authors of the group of authors at least by analyzing a subset of author profiles corresponding to the group of authors and at least by performing one or more first correlation analyses, wherein the second affinity and the third affinity are unknown or unexpected prior to determining the second and the third affinities;

generating correlation data based in part or in whole upon a result of determining the second affinity and the third affinity; and generating an action for the group of authors based at least in part on the second affinity and the third affinity, wherein an author profile of the plurality of author profiles comprises a vector comprising a value for the first topic of interest and indicating an affinity or a strength pertaining to the first topic between the author and a different author of the group of authors.

5. The method of claim 4, further comprising:

performing semantic filtering on the data for reducing irrelevant data from the data, wherein the themes analysis comprises a latent semantic analysis that analyzes contextual and semantic significance of one or more terms that appear within the data;

identifying the set of themes from the data based in part or in whole upon a result of the themes analysis and a result of classifying the data;

generating or updating the plurality of author profiles for the data based in part or in whole upon the respective strengths for the group of authors and further based at least in part upon the set of themes;

identifying a set of rules from a rulebase accessible by the author profiling tool;

dispatching, at a rule and workflow engine, actionable data for the group of authors to the plurality of computing systems based in part or in whole upon the set of rules, wherein a rule provides how the actionable data is to be dispatched;

determining contextual and semantic significance in the data created by the group of authors at least by performing classification and filtering on the data; and identifying one or more specific themes within the data based in part or in whole upon one or more topics and one or more subjects revealed from the themes analysis and the classification.

6. The method of claim 5, further comprising:

categorizing the multiple topics and the multiple subjects of the data to create a number of categories;

associating the respective strengths with the number of categories, the respective strength indicating relative affinities of the first subgroup of authors to a particular topic, a particular subject, or a particular theme; and defining or updating the vector for each of the authors using at least the respective strengths and the number of categories, the vector establishing an author profile for a specific author and being used to describe and analyze the specific author with respect to one or more affinities of the specific author.

7. The method of claim 6, wherein the determining the second topic of interest further comprises:

identifying first multiple author profiles respectively corresponding to the first multiple authors based at least in part on the first topic of interest, without referencing first information about the first topic of interest;

identifying the second topic of interest at least by performing the correlation analysis that analyzes second multiple author profiles, without referencing second information or about the second topic of interest, wherein the second topic of interest is common among the second multiple authors corresponding to the second multiple author profiles;

identifying one or more authors in response to an identification of the second topic of interest based in part or in whole upon one or more vectors or one or more relative strengths of the one or more authors with respect to the second topic of interest; and establishing an author-to-author correlation between the one or more authors and the specific author in response to the identification of the second topic of interest.

8. A computer program product embodied on a non-transitory computer usable medium having stored thereon a sequence of instructions which, when executed by a processor, causes the processor to execute a set of acts for analyzing data, the set of acts comprising:

receiving, at an author profiling tool, data created by a group of authors;

determining a first topic of interest from the data created by the group of authors at least by:
profiling the group of authors at least by performing themes analysis upon the data for generating a plurality of author profiles;
generating the plurality of author profiles for identifying the first topic of interest based at least in part upon a result from the themes analysis; and
determining the first topic at least by analyzing the plurality of author profiles;

determining a first subgroup having first multiple authors in the group of authors at least by classifying the first multiple authors into the first subgroup based at least in part upon the first topic;

for the first subgroup, determining a second topic of interest common to second multiple authors in the first subgroup at least by performing a correlation analysis that analyzes at least some profiles of the first multiple authors in the first subgroup; and for the second topic of interest, determining a second subgroup having second multiple authors from the first subgroup, wherein the second topic of interest is common to the second subgroup of authors, and the second topic is different from the first topic.

9. The computer program product of claim 8, further comprising generating actionable data using at least some of the plurality of author profiles, wherein the first topic of interest is determined without targeting specific groups of authors and without preconceived notions about the data in the themes analysis, wherein generating the plurality of author profiles further comprises:

identifying a theme within the data that is created by the group of authors; and generating a respective strength number corresponding to an extent or degree of interest by the author for the first topic of interest, wherein
the data is received at the author profiling tool and is not targeting specific demographic groups, the first topic of interest is determined from the data without targeting the specific demographic groups, and the first topic of interest is determined with the themes analysis without preconceived notions about the data in the themes analysis.

10. The computer program product of claim 8, the set of acts further comprising:

correlating the first subgroup with the second subgroup in response to an identification of the second topic of interest, wherein the data is not targeting specific demographic groups of authors;

classifying the data created by the group of authors into a plurality of classes based in part or in whole upon topics of interest determined by the themes analysis, classifying the data including:
creating a set of themes from results of the themes analysis;
determining multiple subjects of multiple topics of interest based in part or in whole upon the set of themes;
determining similarity among the multiple subjects of the multiple topics of interest at least by analyzing the plurality of author profiles;
clustering the multiple topics of interest into the plurality of classes based in part or in whole upon the similarity among the multiple subjects;

determining the respective strengths for the group of authors, a respective strength for an author of the first subgroup of authors indicating relative affinities of the first subgroup to a category in the data relative to one or more remaining categories in the data;

associating the respective strengths that respectively correspond to the group of authors with a plurality of categories; and creating a first vector for each author of the group of authors, wherein vectors for the group of authors respectively indicate respective affinities among the first subgroup to one or more common topics of interests or one or more subjects.

11. The computer program product of claim 10, the set of acts further comprising:

modifying the plurality of classes determined from classifying the data created by the group of authors at least by reducing a false positive, a false negative, and inappropriate content with a filtering process;

identifying actionable data based in part or in whole upon a result of the filtering process, wherein the data created by the group of authors includes contents transcribed from non-social data;

determining, at a rule and workflow module stored at least partially in memory, a plurality of computing systems to receive the actionable data based in part or in whole upon a set of rules that identifies how the actionable data is to be processed and directed;

preconfiguring a plurality of types of topics of interest;

determining a first set of authors that corresponds to one or more first types of topics of interest of the plurality of types of topics of interest at least by analyzing the plurality of author profiles to identify a first set of author profiles respectively corresponding to the first set of authors;

determining second commonality within one or more second types of topics of interest of the plurality of types of topics of interest without pre-defining the one or more second types of topics of interest;

identifying first commonality among the data in response to the one or more second types of topics of interest based in part or in whole upon results of the themes analysis;

identifying a group of authors that corresponds to a first affinity for a first subject;

determining a second affinity and a third affinity shared by at least a threshold percentage of authors of the group of authors at least by analyzing a subset of author profiles corresponding to the group of authors and at least by performing one or more first correlation analyses, wherein the second affinity and the third affinity are unknown or unexpected prior to determining the second and the third affinities;

generating correlation data based in part or in whole upon a result of determining the second affinity and the third affinity; and generating an action for the group of authors based at least in part on the second affinity and the third affinity, wherein an author profile of the plurality of author profiles comprises a vector comprising a value for the first topic of interest for the author and indicating an affinity or a strength pertaining to the first topic between the author and a different author of the group of authors.

12. The computer program product of claim 11, further comprising:

performing semantic filtering on the data for reducing irrelevant data from the data, wherein the themes analysis comprises a classification that classifies the data into multiple themes and a latent semantic analysis that analyzes contextual and semantic significance of one or more terms that appear within the data;

identifying the set of themes from the data based in part or in whole upon a result of the themes analysis and a result of classifying the data;

generating or updating the plurality of author profiles for the data based in part or in whole upon the respective strengths for the group of authors and further based at least in part upon the set of themes;

identifying a set of rules from a rulebase accessible by the author profiling tool;

dispatching, at a rule and workflow engine, actionable data for the group of authors to the plurality of computing systems based in part or in whole upon the set of rules, wherein a rule provides how the actionable data is to be dispatched;

determining contextual and semantic significance in the data created by the group of authors at least by performing classification and filtering on the data; and identifying one or more specific themes within the data based in part or in whole upon one or more topics and one or more subjects revealed from the themes analysis and the classification.

13. The computer program product of claim 12, the set of acts further comprising:

categorizing the multiple topics and the multiple subjects of the data to create a number of categories;

associating the respective strengths with the number of categories, the respective strength indicating relative affinity of each author of the first subgroup to a particular topic, a particular subject, or a particular theme; and defining or updating the vector for each author using at least the respective strengths and the number of categories, the vector establishing an author profile for a specific author and being used to describe and analyze the specific author with respect to one or more affinities of the specific author.

14. The computer program product of claim 13, the set of acts further comprising:
determining the second topic of interest common to the second subgroup having the second multiple authors, without targeting specific demographic groups of authors or referencing preconceived information about the data for identifying the second topic of interest, at least by:
identifying first multiple author profiles corresponding to the first multiple authors based at least in part on the first topic of interest, without preconceived notions about the data for identifying the first topic of interest;
identifying the second topic of interest at least by performing the correlation analysis that analyzes second multiple author profiles in the first multiple author profiles without the preconceived information about the data for identifying the second topic of interest, wherein the second topic of interest is common to second multiple authors corresponding to the second multiple author profiles;
identifying one or more authors in response to an identification of the second topic of interest based in part or in whole upon one or more vectors or one or more relative strengths of the one or more authors with respect to the second topic of interest; and
establishing a correlation between the one or more authors and the specific author in response to the identification of the second topic of interest.

15. A computer system for analyzing data, comprising:
a computer processor to execute a set of program code instructions; and
a memory to hold the set of program code instructions, in which the set of program code instructions comprises instructions for:
receiving, at an author profiling tool, data created by a group of authors;
determining a first topic of interest from the data created by the group of authors at least by:
profiling the group of authors at least by performing themes analysis upon the data for generating a plurality of author profiles;
generating the plurality of author profiles for identifying the first topic of interest based at least in part upon a result from the themes analysis; and
determining the first topic at least by analyzing the plurality of author profiles;
determining a first subgroup having first multiple authors in the group of authors at least by classifying the first multiple authors into the first subgroup based at least in part upon the first topic;
for the first subgroup, determining a second topic of interest common to second multiple authors in the first subgroup at least by performing a correlation analysis that analyzes at least some profiles of the first multiple authors in the first subgroup; and
for the second topic of interest, determining a second subgroup having second multiple authors from the first subgroup, wherein the second topic of interest is common to the second subgroup of authors, and the second topic is different from the first topic.

16. The computer system of claim 15, the set of program code instructions further comprising instructions for generating actionable data using at least some of the plurality of author profiles, wherein the first topic of interest is determined without targeting specific demographic groups of users and without preconceived notions about the data for identifying the first topic of interest, wherein the set of program code instructions for generating the plurality of author profiles further comprise the instructions for:
identifying a theme within the data that is created by the group of authors; and
generating a respective strength number corresponding to an extent or degree of interest by the author for the first topic of interest, wherein
the data is received at the author profiling tool and is not targeting the specific demographic groups,
the first topic of interest is determined from the data with the themes analysis without targeting the specific demographic groups, and
the first topic of interest is determined from the data with the themes analysis without preconceived notions about the data in the themes analysis.

17. The computer system of claim 15, wherein the set of program code instructions for generating the plurality of author profiles further comprises the instructions for:
correlating the first subgroup with the second subgroup in response to an identification of the second topic of interest, wherein the data is received from the group of authors without targeting specific demographic groups of authors;
classifying the data created by the group of authors into a plurality of classes based in part or in whole upon topics of interest determined by the themes analysis, classifying the data including:
creating a set of themes from results of the themes analysis;
determining multiple subjects of multiple topics of interest based in part or in whole upon the set of themes;
determining similarity among the multiple subjects of the multiple topics of interest at least by analyzing the plurality of author profiles;
clustering the multiple topics of interest into the plurality of classes based in part or in whole upon the similarity among the multiple subjects;
determining the respective strengths for the group of authors, a respective strength for an author of the group of authors indicating a relative affinity of the author to a category in the data relative to one or more remaining categories in the data;
associating the respective strengths that respectively correspond to the group of authors with a plurality of categories; and
creating a first vector for each author of the group of authors, wherein vectors for the group of authors respectively indicate respective affinities among the first subgroup to one or more common topics of interests or one or more subjects.

18. The computer system of claim 17, wherein the set of program code instructions further comprises instructions for:
modifying the plurality of classes determined from classifying the data created by the group of authors at least by reducing a false positive, a false negative, and inappropriate content with a filtering process;
identifying actionable data based in part or in whole upon a result of the filtering process, wherein the data created by the group of authors includes contents transcribed from non-social data;

determining, at a rule and workflow module stored at least partially in memory, a plurality of computing systems to receive the actionable data based in part or in whole upon a set of rules that identifies how the actionable data is to be processed and directed;

preconfiguring a plurality of types of topics of interest;

determining a first set of authors that corresponds to one or more first types of topics of interest of the plurality of types of topics of interest at least by analyzing the plurality of author profiles to identify a first set of author profiles respectively corresponding to the first set of authors;

determining second commonality within one or more second types of topics of interest of the plurality of types of topics of interest without pre-defining the one or more second types of topics of interest;

identifying first commonality among the data in response to the one or more second types of topics of interest based in part or in whole upon results of the themes analysis;

identifying a group of authors that corresponds to a first affinity for a first subject;

determining a second affinity and a third affinity shared by at least a threshold percentage of authors of the group of authors at least by analyzing a subset of author profiles corresponding to the group of authors and at least by performing one or more first correlation analyses, wherein the second affinity and the third affinity are unknown or unexpected prior to determining the second and the third affinities;

generating correlation data based in part or in whole upon a result of determining the second affinity and the third affinity; and generating an action for the group of authors based at least in part on the second affinity and the third affinity, wherein an author profile of the plurality of author profiles comprises a vector comprising a value for the first topic of interest and indicating an affinity or a strength pertaining to the first topic between the author and a different author of the group of authors.

19. The computer system of claim 18, the set of program code instructions further comprising instructions for:

performing semantic filtering on the data for reducing irrelevant data from the data, wherein the themes analysis comprises a classification that classifies the data into multiple themes and a latent semantic analysis that analyzes contextual and semantic significance of one or more terms that appear within the data;

identifying the set of themes from the data based in part or in whole upon a result of the themes analysis and a result of classifying the data;

generating or updating the plurality of author profiles for the data based in part or in whole upon the respective strengths for the group of authors and further based at least in part upon the set of themes;

identifying a set of rules from a rulebase accessible by the author profiling tool;

dispatching, at a rule and workflow engine, actionable data for the group of authors to the plurality of computing systems based in part or in whole upon the set of rules, wherein a rule provides how the actionable data is to be dispatched;

determining contextual and semantic significance in the data created by the group of authors at least by performing classification and filtering on the data; and identifying one or more specific themes within the data based in part or in whole upon one or more topics and one or more subjects revealed from the themes analysis and the classification.

20. The computer system of claim 15, the set of program code instructions further comprising instructions for:

determining the second topic of interest common to the second subgroup having the second multiple authors, without targeting specific demographic groups of authors or preconceived information about the data for identifying the second topic of interest, at least by:

identifying first multiple author profiles corresponding to the first multiple authors based at least in part on the first topic of interest, without preconceived notions about the data for identifying the first topic of interest;

identifying the second topic of interest at least by performing the correlation analysis that analyzes second multiple author profiles in the first multiple author profiles without the preconceived information about the data for identifying the second topic of interest, wherein the second topic of interest is common to second multiple authors corresponding to the second multiple author profiles;

identifying one or more authors in response to an identification of the second topic of interest based in part or in whole upon one or more vectors or one or more relative strengths of the one or more authors with respect to the second topic of interest; and establishing a correlation between the one or more authors and a specific author in response to the identification of the second topic of interest.

* * * * *